(12) United States Patent
Iimura

(10) Patent No.: US 6,238,630 B1
(45) Date of Patent: May 29, 2001

(54) PHOTOCATALYST DEVICE AND PHOTOCATALYST REACTOR

(76) Inventor: Keiji Iimura, 10-8, Akatsuka 3-Chome, Itabashi-Ku, Tokyo (JP)

(*) Notice: Subject to any disclaimer, the term of this patent is extended or adjusted under 35 U.S.C. 154(b) by 0 days.

(21) Appl. No.: 09/146,917

(22) Filed: Sep. 2, 1998

(51) Int. Cl.[7] ................................................. B01J 19/08

(52) U.S. Cl. ..................... 422/186.3; 422/121; 422/122

(58) Field of Search ............................... 422/22, 24, 121, 422/122, 186.3

(56) References Cited

U.S. PATENT DOCUMENTS

| | | | |
|---|---|---|---|
| 5,137,607 | * 8/1992 | Anderson et al. | 204/59 R |
| 5,449,443 | * 9/1995 | Jacoby et al. | 204/157.3 |
| 5,501,801 | * 3/1996 | Zhang et al. | 210/748 |
| 5,778,664 | * 7/1998 | Janata et al. | 422/186.3 |
| 5,875,384 | * 2/1999 | Peill et al. | 422/186.3 |
| 5,919,422 | * 7/1999 | Yamanaka et al. | 422/121 |

* cited by examiner

Primary Examiner—Robert J. Warden, Sr.
Assistant Examiner—Theresa T. Snider

(57) ABSTRACT

A photocatalyst device includes light guide member composed of a substantially transparent member having a first surface and/or a second surface, a plurality of diffusing areas and a plurality of non-diffusing areas disposed alternately on the first surface and/or the second surface, and photocatalyst member including photocatalyst material, being disposed adjacent to the transparent member, or being disposed on the transparent member. Further, a photocatalyst reactor includes the photocatalyst device as described in the above and one or more light sources generating light directed toward the transparent member. The transparent member may be composed of a transparent panel having a substantially uniform thickness or a substantially variable thickness. A density of the diffusing areas and/or the non-diffusing areas may be variably distributed on the first surface and/or the second surface. The diffusing areas may be rough surface areas and/or the non-diffusing areas may be smooth surface areas.

8 Claims, 15 Drawing Sheets

PHOTOCATALYST DEVICE AND PHOTOCATALYST REACTOR

BACKGROUND OF THE INVENTION

1. Field of the Invention

The invention relates to a device and a reactor including photocatalyst.

More particularly, this invention relates to the method in which the photocatalyst is activated by light rays with relatively short wavelength and a substance is subject to reaction of oxidation and/or reduction when the substance is in contact with or in close vicinity to the photocatalyst. Further, the invention relates to the device having photocatalyst layer including photocatalyst and further the invention relates to the reactor having photocatalyst layer including photocatalyst and a light source generating the light rays with relatively short wavelength.

2. Description of Related Art

It is well know that a photocatalyst activating by light rays with relatively short wavelength decomposes or dissolves an organic substance which is in contact with, in close vicinity to, or deposited on the photocatalyst by reaction of oxidation and/or reduction or photocatalyst effect.

Typical photocatalyst is a kind of photo activated semiconductor such as Titanium Dioxide ($TiO_2$).

There are many fields of application of such photocatalyst, for instance, cleaning to delete dirty component from the surface of articles, dirt protection to prevent depositing of dirty component, prevention from spread of infection, deleting of odor, cleaning of air, processing of exhausting gas, cleaning of water, processing of exhausting water, dissolving of a water to make Hydrogen, speeding up of a chemical reaction and dissolving of pollutant which cause social pollution.

All the applications as mentioned above utilize the photocatalyst reaction of photocatalyst function by strong oxidation-reduction power to exert when the photocatalyst is activated by light.

For example, the photocatalyst being radiated by the light rays with short wavelength activates any Oxygen($O_2$) existing in the air, that dissolved or mixed in water, to form Ozone($O_3$) or activated Oxygen($O_1$). The Ozone or the activated Oxygen decomposes microorganisms such as fungi (i.e. molds) bacteria and organic chlorine compound containing in the water by oxidization. Therefore, the odorless or color-less water is obtained and the water is sterilized.

Furthermore, the photocatalyst being radiated by the light rays having short wavelength shows a high activity of water's decomposition and helps to decompose the water ($H_2O$) to activated oxygen($O$) and hydrogen($H_2$).

Moreover, the photocatalyst as the material to eliminate or decrease environmental pollution. contributes to the decomposition of pollutants in which the pollutants contain a volatile organic solvent such as trichroloethylene, tetrachroloethylene, a chemical agent for agriculture such as grass eliminating agent bioinsecticide, an organic phosphate and a harmful inorganic chemical compound such as cyan and a kind of chrome.

Where multiple photocatalyst particles are used directly for reaction of oxidation-reduction with any substance, it is very difficult to separate and collect the photocatalyst particles and a device to utilize photocatalyst particles becomes complicated and large scale.

While, where multiple photocatalyst particles are used as a form of photocatalyst supported substrate in which a layer including the photocatalyst particles is fixed and supported on the substrate, recycling of the photocatalyst particles can be easily done because the separation and collection of the photocatalyst particles are not needed.

As for the latter case using the photocatalyst supported substrate, the publication of unexamined patent application of Japan No. 155726/1993 discloses that a Titanium Dioxide layer of photocatalyst is coated on a substrate such as metal, ceramic and glass, for the purpose of protecting a surface of the substrate from growth of bacteria.

Referring to FIG. 5 and FIG. 6, a typical prior art showing a device including photocatalyst(a substrate device supporting photocatalyst, a device with photocatalyst, or a photocatalyst device) is explained in which a layer including photocatalyst particles is fixed on a substrate.

FIG. 5 illustrates a schematic perspective view of a photocatalyst reactor showing the prior art of FIG. 6 illustrates a schematic enlarged cross-sectional view taken along the line B—B in FIG. 5, showing the photocatalyst device 300.

In FIG. 5 and FIG. 6, the photocatalyst device 300 consists of a plate like substrate 30 made from metal, ceramic or glass and a photocatalyst layer 20 made of binder layer including many photocatalyst particles in which the photocatalyst layer 20 is formed or fixed on the substrate 30.

As shown in FIG. 5, a conventional photocatalyst reactor consists of the photocatalyst device 300 having the substrate 30 and the photocatalyst layer 20 and a short wavelength light source 210(typically Ultraviolet light source) generating short wavelength light rays, such as Ultraviolet(UV) light rays. The light source 210 is preferably composed of a lamp having a linear shape (i.e. a tubular shape).

The short wavelength light source 210 is installed at a location, distant from the photocatalyst layer 20 of photocatalyst device 300, keeping a vertical distance "D".

As shown in FIGS. 5 and 6, the UV light rays L10 generating from the Ultraviolet light source 210 are directed toward a front surface of the substrate 30 and radiate directly a front surface of photocatalyst layer 20 coated on the front surface of the substrate 30.

Reference mark "OB" indicating as circle in FIG. 5 shows an object to be cleaned-up or purified, or a dirty component such as dirty substance by foods, molds, bacteria, dirty substance by oil, which is in contact with, inclose vicinity to, or deposited on the photocatalyst layer 20.

In an area which the dirty object "OB" exists, a large amount of the UV light rays L10 is absorbed (or reflected) at the dirty object "OB", on the way passing through the dirty object "OB". Therefore only a small amount of such light rays L10 reaches to the photocatalyst layer 20 in the area and the photocatalyst layer 20 in the area is activated or energizes in small rate by the UV light rays L10 with reduced lighting power.

Further, where the object "OB" composed of various media such as liquid(water, etc.) or gas(exhaust gas, etc.) are cleaned-up or process to react for clarification, the object "OB" exists between the UV light source 210 and the photocatalyst device 300. In this case, the object "OB" absorbs (or reflects) some amount of the UV light rays L10 radiated from the UV light source 210 and the photocatalyst layer 20 of the photocatalyst device 300 receives the remaining amount of UV light rays L10. Therefore, only the remaining amount of UV light rays L10 activates the photocatalyst layer 20.

As well known, water(generally liquid) can easily transmit visible light rays, while it absorbs short wavelength light rays L10 such as UV rays instead of transmitting.

Accordingly, in the prior art, an efficiency of short wavelength light rays L10 used for activation of photocatalyst is too low, because the object "OB" is existing between the short wavelength light source 210 and the photocatalyst layer 20 of the photocatalyst device 300.

Therefore, the prior art has such disadvantage that an effective use is not made for the short wavelength light rays L10 radiating(emitting) from the short wavelength light source 210 and a large volume of the short wavelength light source 210 with high power is required to accelerate a photocatalyst reaction in the photocatalyst reactor 300 and 210.

SUMMARY OF THE INVENTION

A main object of the invention is to provide a new method for activating photocatalyst, new device and reactor, including photocatalyst.

A further main object of the invention is to provide new method for activating photocatalyst, new device and reactor, including photocatalyst, in which a photocatalyst layer supported on a substrate is not required to exist or present between an object to be cleansed or be processed to make clean-up and a short wavelength rays light source radiating short wavelength rays to activate the photocatalyst layer.

To accomplish the object, the invention is so composed that a light transmission member is used for a substrate to support a photocatalyst layer, the light transmission member is capable of transmitting light rays with comparatively short wavelength, the transmitting light rays are introducing from outside to the light transmission member and the photocatalyst layer is activated by radiation of the light rays which are leaked gradually from inside of the light transmission member to the photocatalyst layer on the way of repeated reflection inside the light transmission member.

In more detail, a photocatalyst device of the present invention comprises a light transmission member which is capable of transmitting light rays with comparatively short wavelength and a photocatalyst layer including photocatalyst supported on light transmission member.

In more detail, a photocatalyst reactor of the present invention comprises a light transmission member which is capable of transmitting light rays with comparatively short wavelength and a photocatalyst layer including photocatalyst supported on light transmission member, and a light source of short wavelength rays, which generate or emit the light rays with comparatively short wavelength.

The above mentioned light rays are introduced from outside to inside of the above mentioned light transmission member, they repeat multiple reflection inside the light transmission member and they leak out gradually from the light transmission member.

And the above mentioned photocatalyst layer is activated by radiation of the light rays which are leaked from the light transmission member.

Further, the above mentioned light rays are directed to the above mentioned light input portion in the above mentioned light transmission member.

According to the photocatalyst device and the photocatalyst reactor of the present invention, the light rays with relatively short wavelength are so constructed that the light transmission member or light transmission substrate supports the photocatalyst layer on surface/surfaces in the light transmission member, the short wavelength light rays being introduced from a portion of the light transmission member are once converted to a flat type illumination light radiating the short wavelength light rays and the photocatalyst layer supported on the light transmission member are activated by radiation of the short wavelength light rays from the flat type illumination light.

The object to be cleaned, or reacted, etc. which is contacted, closed to, or stacked is cleaned-up or processed to react for clarification by oxidation and/or reduction.

In compared to the prior art as explained with FIG. 5 and FIG. 6, any objects to be cleaned, or reacted, etc. are not existed between the surface/surfaces of photocatalyst layer and a short wavelength light source in the present invention.

Therefore, the photocatalyst device of the present invention has a high using factor of the short wavelength light rays for activating the photocatalyst to be able to use effectively a large amount of the light rays without loss of the light rays, and furthermore, the photocatalyst reactor of the present invention is able to use the sort wavelength light source with relatively a smaller power than that of the prior art.

BRIEF DESCRIPTION OF THE DRAWINGS

A complete understanding of this invention may be obtained from the following explanations, in connection with the accompanying drawings; in which.

DESCRIPTION OF THE PREFERRED EMBODIMENTS

Figure 1:
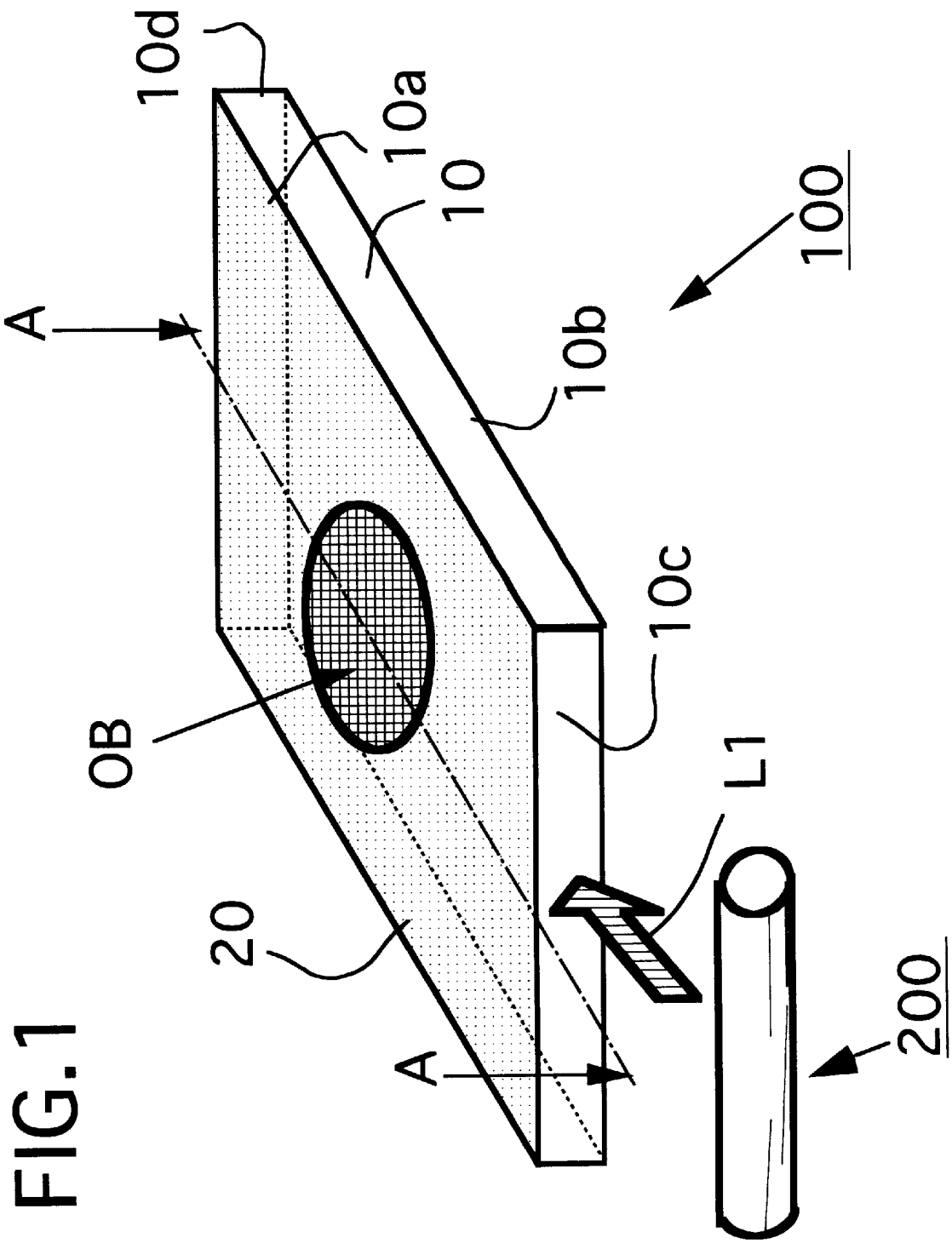
FIG. 1 illustrates a schematic perspective view of a photocatalyst reactor, explaining a basical preferred embodiment of the present invention.

The present invention will now be described in detail with reference to the drawings.

Like reference characters designate like or corresponding parts or portions throughout the drawings.

Figure 2:
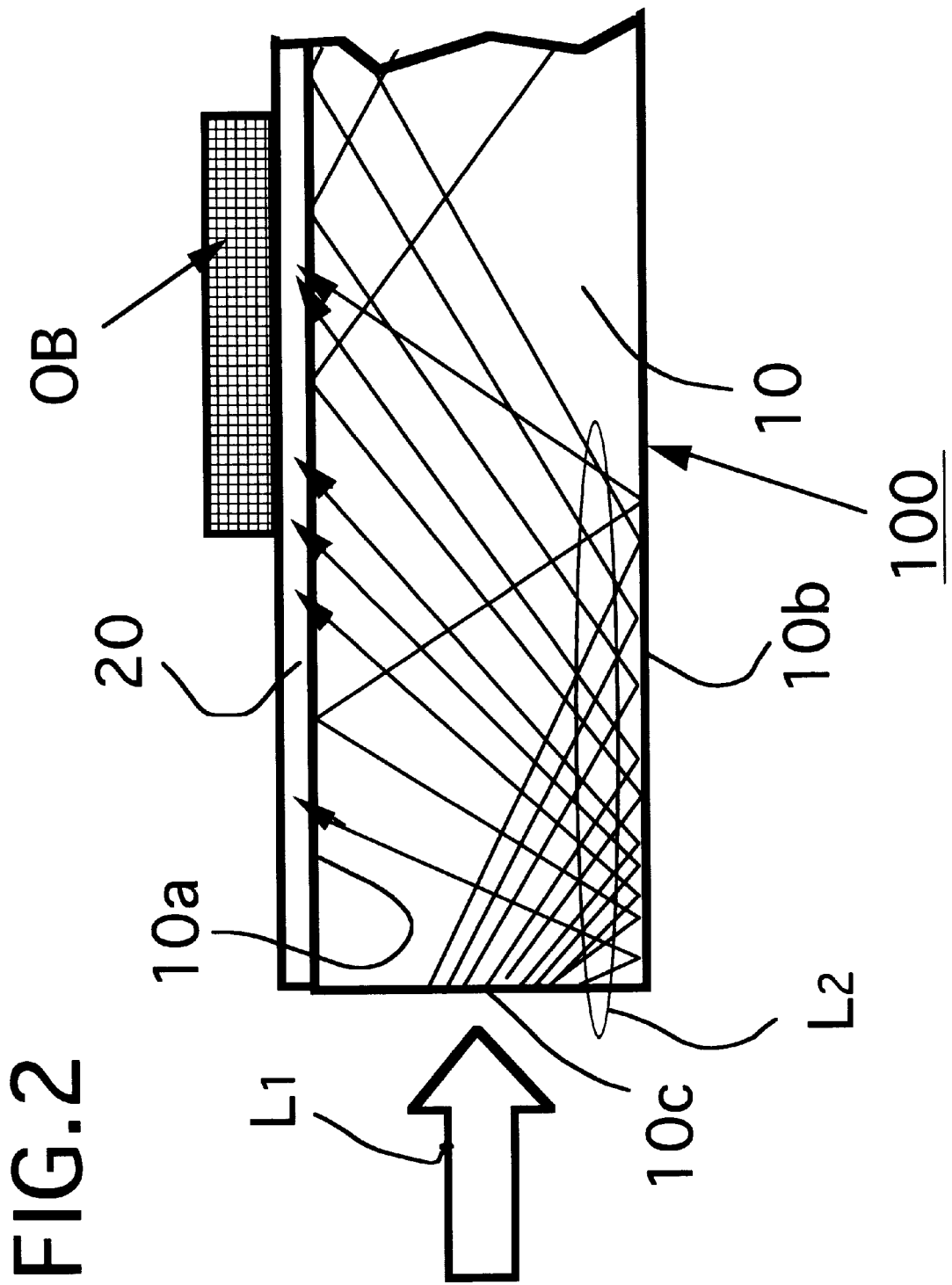
FIG. 2 illustrates a partially omitted, schematic enlarged cross-sectional view taken along the line A—A in FIG. 1, showing the photocatalyst device 100.

Reference is made to FIG. 1 and FIG. 2 showing one preferred basic embodiment of this invention.

FIG. 1 illustrates a schematic perspective view of a photocatalyst reactor and FIG. 2 illustrates a partially omitted, schematic enlarged cross-sectional view taken along the line A—A in FIG. 1, showing the photocatalyst device 100.

In FIG. 1 and FIG. 2, the photocatalyst device 100 composes a panel type light transmission member (or a light transmission panel) 10 which can transmit well short wavelength rays L1 and a photocatalyst layer 20 including photocatalyst in which it is supported on a front surface 10a of the light transmission panel 10. Numeral 10b shows a rear surface, number 10c shows a side terminal surface, number 10d shows another side terminal surface 10d in the light transmission panel 10 and reference character "OB" shows the object to be cleaned, or reacted, etc.

The light transmission panel 10 may be made from inorganic material such as Fused Quartz (including not less than 99.9 weight % of SiO2), Sapphire, Borosilicate glass (composing SiO2; 75.3, B2O3; 13.8; ZnO; 1.4, Al2O3; 4.3, NaO; 5.0 weight %), etc. and it may be made of organic material such as Silicone resin such as Dimethyl Silicone, Acrylic resin such as Methacrylate, Polyethylene, Polycarbonate resin and UV transmissible Fluoric resin such as Polyfluoroethylene, etc.

The photocatalyst layer 20 includes photocatalyst material which is a kind of photo activated semiconductor selected from Titanium Oxide, i.e. Titanium Dioxide, Tungsten Oxide, Zinc Oxide, Tin Oxide and Zinc Sulfide. The photocatalyst layer 20 may be composed of multiple photocatalyst particles and an organic or inorganic binder to bind and fix the photocatalyst particles on the light transmission panel 10. A photocatalyst adding special metal such as Titanium Dioxide with a small amount of platinum has an excellent photocatalyst function.

In more detail, the photocatalyst layer 20 may be composed of multiple photocatalyst particles and transparent organic binder or paint capable of transmitting the short wavelength rays L1 such as such as Silicone resin, Acrylic resin, Polycarbonate resin and UV transmissible Fluoric resin, Polyester resin etc. Alternatively, the photocatalyst layer 20 may be composed of multiple photocatalyst particles and the transparent inorganic binder capable of transmitting the short wavelength rays L1 such as glass frit (i.e. powders or particles).

Alternatively, the photocatalyst layer 20 may be made from Titania sol, which is in advance coated on the inorganic light transmission panel 10, is treated by high temperature of about 500° C. then the Titania sol changes to Titanium Dioxide.

As shown in FIG. 1, a linear or tubular short wavelength light source 200 is placed at a vicinity of one side terminal surface 10c of the light transmission panel 10 in order to radiate or emit the short wavelength rays L1 which is introduced or input into the light transmission panel 10.

As shown in FIG. 1 and FIG. 2, the short wavelength rays L1(indicated as an arrow), radiating from the short wavelength light source 200 are introduced into the light transmission panel 10, the short wavelength rays L2(indicating as another arrow) once input into light transmission panel 10 repeat multiple reflection or internal total reflection, according to similar principle to an optical fiber which is widely used for an optical telecommunication. The short wavelength rays L2 transmitting from the side terminal 10c toward the another side terminal 10d are simultaneously leaked out little by little or gradually to the front surface 10a and the rear surface 10b of the light transmission panel 10.

The short wavelength rays L2 leaking from the front surface 10a are incident and are radiating the photocatalyst layer 20 from a rear side. The photocatalyst layer 20 radiating by the short wavelength rays L2 absorbs the short wavelength rays L2 and is activated.

Reference mark "OB" shows an object to be cleaned-up or purified, or a dirty component such as dirty substance by foods, molds, bacteria, dirty substance by oil, which is existing on, is in contact with, or is deposited on the photocatalyst layer 20.

The photocatalyst layer 20 activated by the short wavelength rays L2 is letting the object "OB" indicated as a circle in FIG. 1 to dissolve and react by oxidation and/or reduction.

Therefore, the photocatalyst device 100 and the photocatalyst reactor (composed of the photocatalyst device 100 and the short wavelength light source 200) are, for instance, capable of easily deleting the object "OB" from the surface of the photocatalyst layer 20, capable of sterilizing bacteria and virus, capable of deleting odor, and capable of deleting color.

In FIG. 1 and FIG. 2, an example is shown where the object "OB" is in contact with or deposited on a part (indicated as a circle area) of the front surface in the photocatalyst layer 20, and also where the object "OB" is in contact with or deposited on almost the entire front surface in the photocatalyst layer 20, similarly it is a matter of course that the object "OB" is able to be processed to dissolve or react.

The kinds of object "OB" to be cleaned up or reacted may be liquid components such as a tap water from a water supply, drain water, oil, etc. and/or gaseous components such as an air with dirty elements, exhaust gas, etc. Such fluid objects "OB" can also be processed to be cleaned up or reacted that the fluid objects "OB" are subject to be contacted with the surface of the photocatalyst layer 20 in the photocatalyst device 100.

Photo-activated semiconductors can be used as the photocatalyst (or the photocatalytic) materials such as Titanium Dioxide; TiO2 (photo activation wavelength; not more than 388 nm), Tungsten Dioxide; WO2 (photo activation wavelength; not more than 388 nm), Zinc Oxide; ZnO (photo activation wavelength; not more than 388 nm), Zinc Sulfide; ZnS (photo activation wavelength; not more than 344 nm) and Tin Dioxide, SnO2 (photo activation wavelength; not more than 326 nm).

The ultraviolet(UV) rays may be used as the short wavelength light rays 200, since they can strongly activate the photocatalyst.

The UV rays are an invisible electromagnetic wave within a range from 380 namo meter(nm) or 3800 angstrom(Å) near visible light rays to X rays. In more details, the UV rays are classified into UV-A rays with wavelength from 380 nm to 315 nm, UV-B rays with wavelength from 380 nm to 315 nm with wavelength from 315 nm to 280 nm and UV-C rays with wavelength from 280 nm to 100 nm.

The UV light source 200 emitting the UV light rays L1 various vacuum discharge lamps such as a germicidal lamp, black light to curt visible light, UV radiated fluorescent lamp, halogen lamp and laser to emit coherent UV laser beam.

The germicidal lamp is a conventional low or high pressure mercury lamp using a UV transmissible glass tube such as transparent fused quartz, which emits UV light rays with short wavelength between the range from 250 nm to 280 nm (center wavelength; 253.7 nm) by discharge of mercury.

The black light is a kind of fluorescent lamp emitting blue color and UV light rays using UV transmissible glass tube with a black filter to cut the UV light rays, or using UV transmissible black filter glass tube to cut only the blue color light rays, which emits UV light rays with medium wavelength between the range from 380 nm to 300 by discharge of mercury.

The UV radiated fluorescent lamp is transparent glass tube without the black filter instead of the black light, which emits blue color light rays and also UV light rays with medium and long wavelength.

The halogen lamp is high pressure mercury lamp adding metal halide inside the lamp tube, which emits UV light rays with medium and long wavelength.

Figure 3:
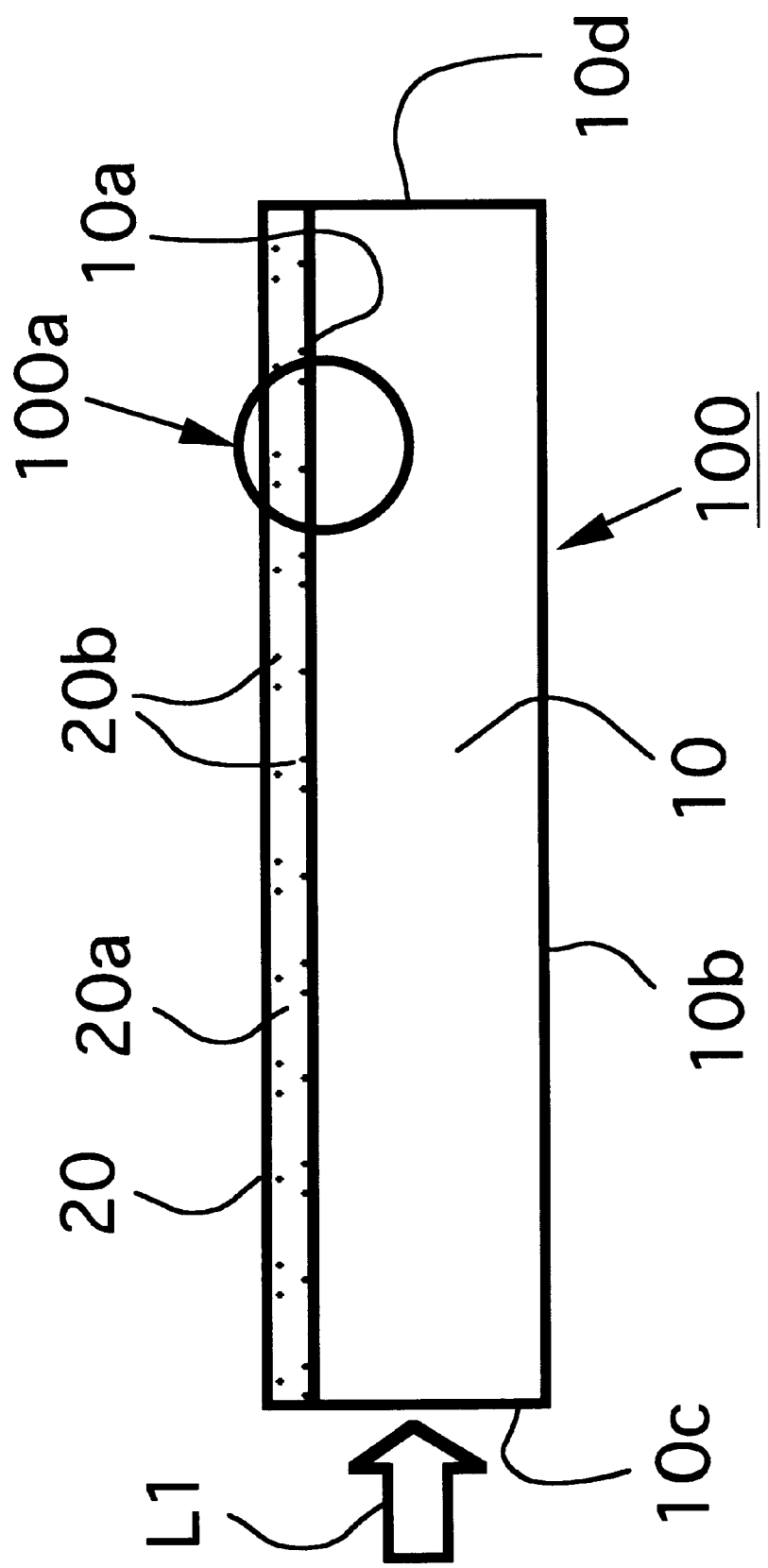
FIG. 3 shows a schematic enlarged cross-sectional view, taken along the line A—A of FIG. 1, in which scale of FIG. 3 is different from FIG. 1 and FIG. 2.
Figure 4:
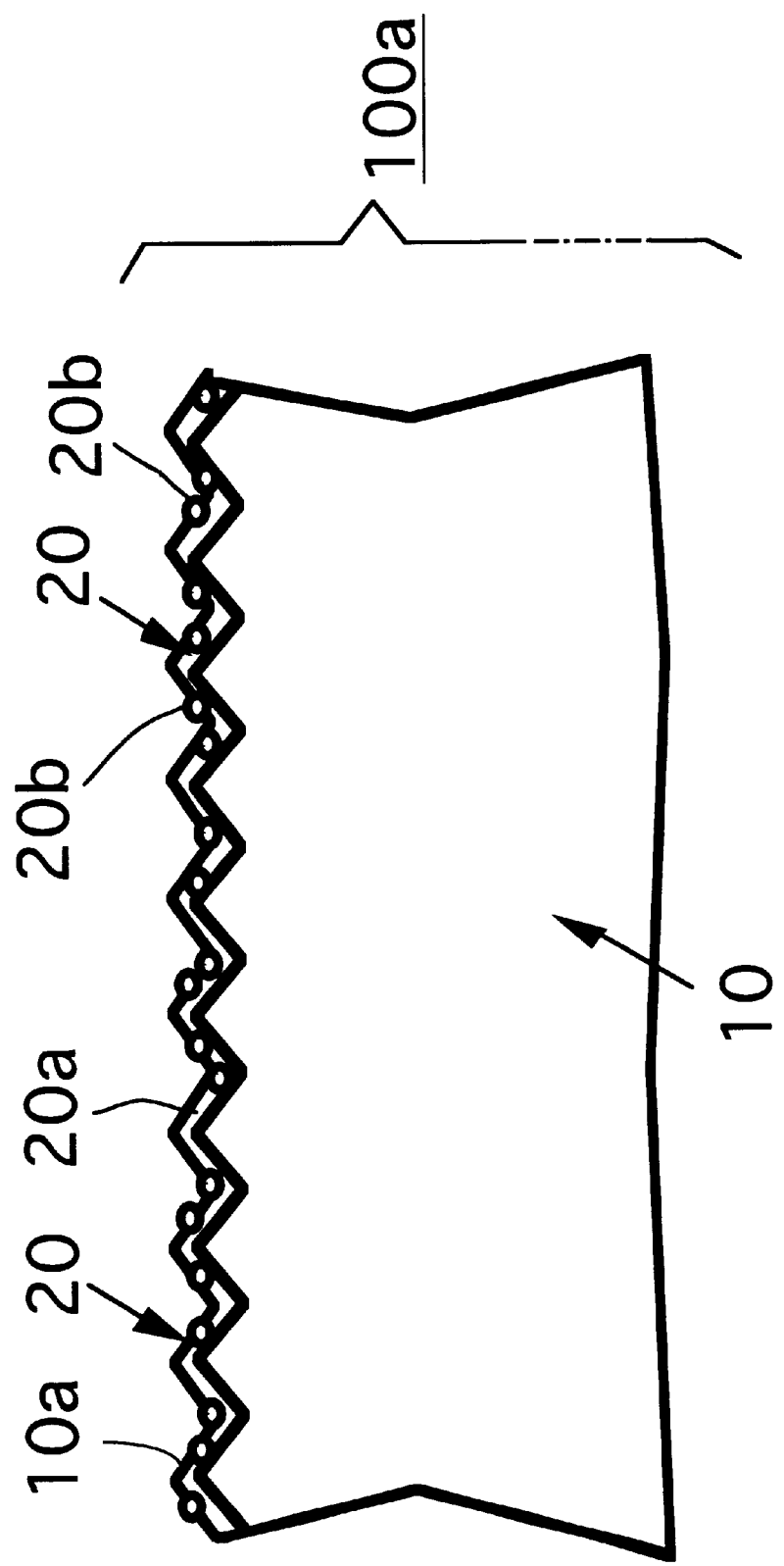
FIG. 4 shows a schematic enlarged cross-sectional view, enlarging a part 100a in FIG. 3.
Figure 5:
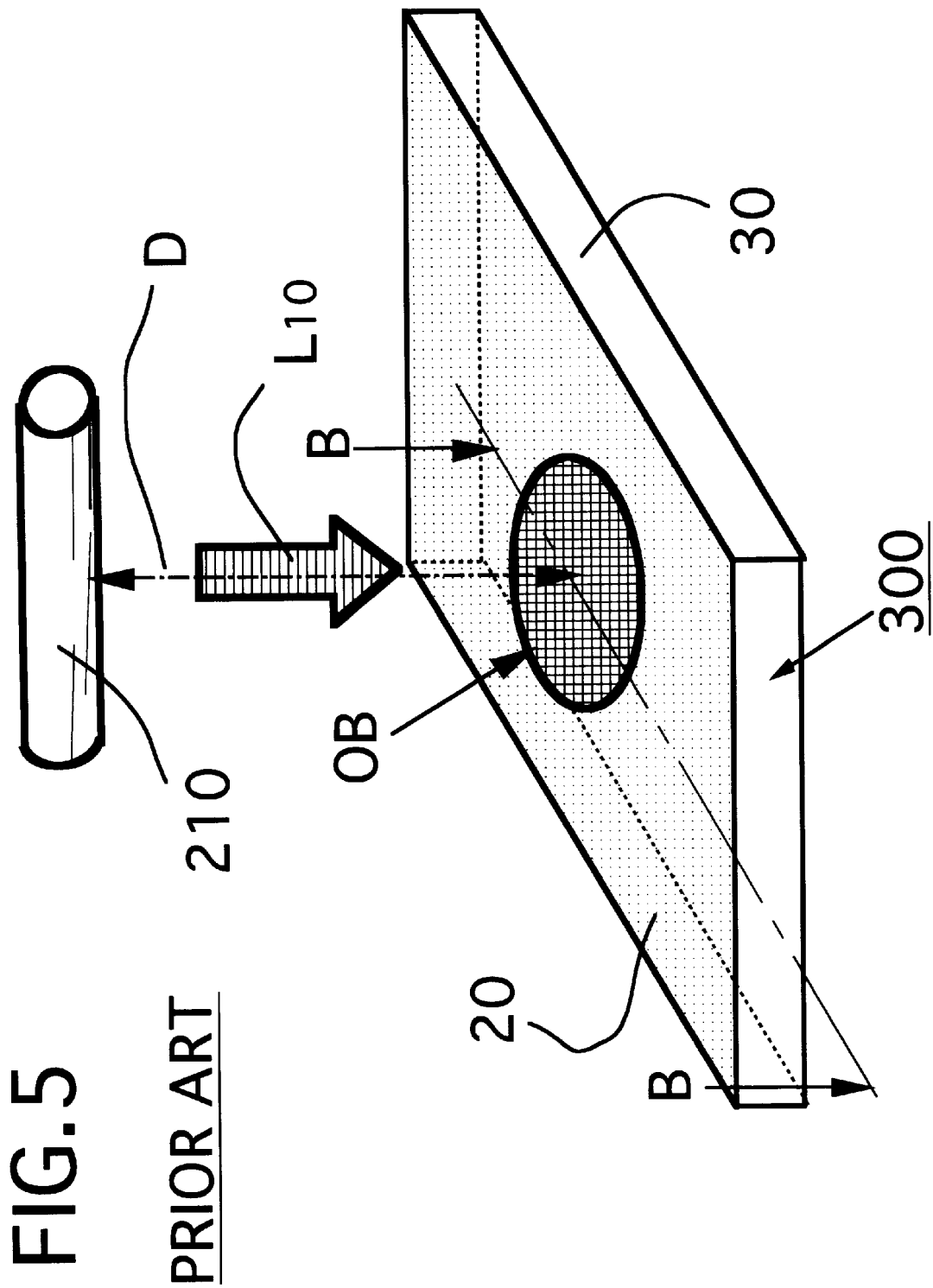
FIG. 5 illustrates a schematic perspective view of a photocatalyst reactor showing the prior art.
Figure 6:
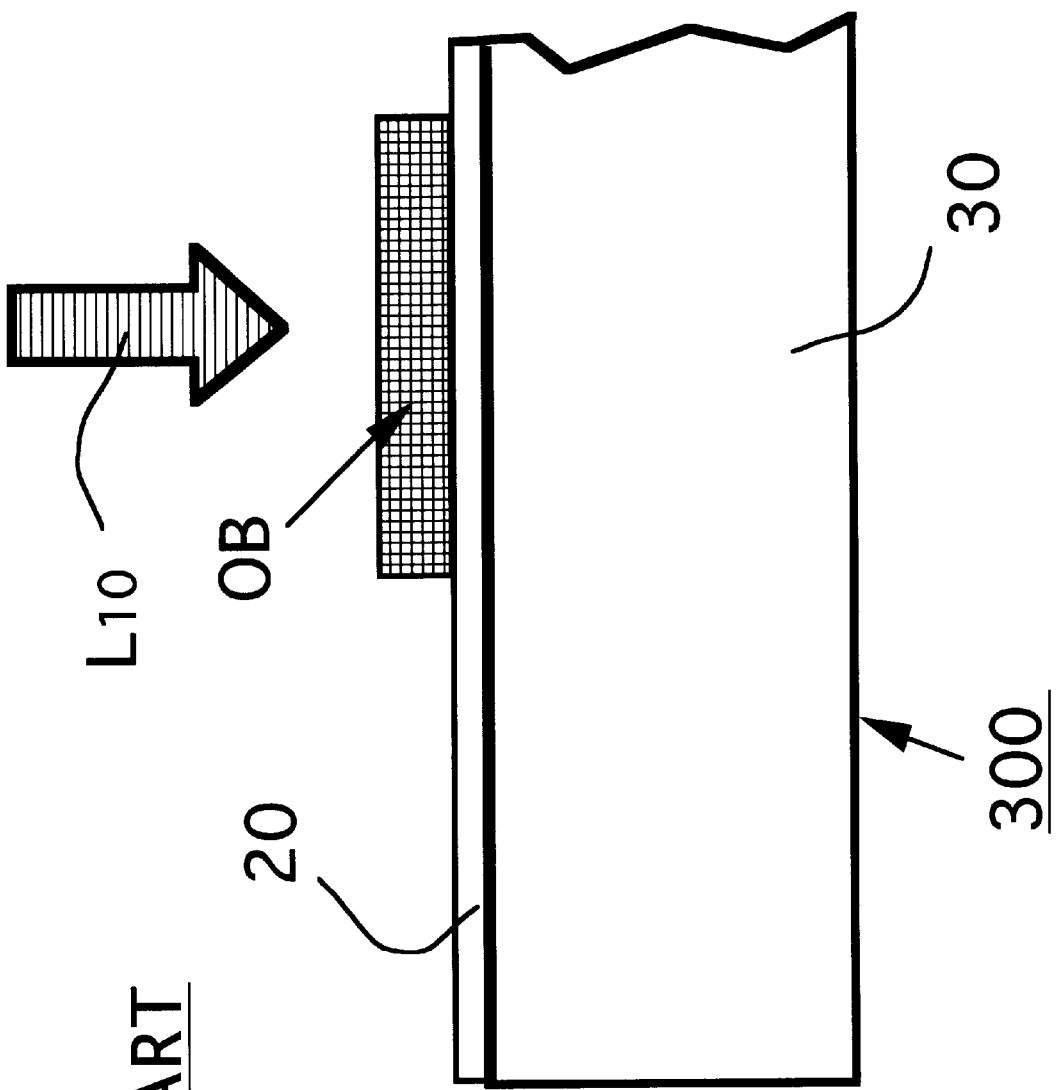
FIG. 6 illustrates a schematic enlarged cross-sectional view taken along the line B—B in FIG. 5, showing the photocatalyst device 300.

FIG. 3 and FIG. 4 illustrate more details of the above mentioned embodiment of the invention, in which the object "OB" is eliminated.

FIG. 3 shows a schematic enlarged cross-sectional view, taken along the line A—A of FIG. 1, in which scale of FIG. 3 is different from FIG. 1 and FIG. 2. FIG. 4 shows a schematic enlarged cross-sectional view, enlarging a part 100a in FIG. 3.

In FIG. 3 and FIG. 4, the photocatalyst device 100 is composed of the short wavelength rays transmitting member 10 of plate like form and the photocatalyst layer 20 including photocatalyst, which is supported on a surface 10a of the member 10. Furthermore, the photocatalyst layer 20 may be composed of many photocatalyst particles 20b and inorganic or organic binding(or bonding) material 20a, in which the photocatalyst particles 20b are fixed securely on the surface 10a of the transmitting member 10 by use of the binder 20a.

As shown in FIG. 4, the front surface 10a is roughly treated by means of conventional emery paper, sand blast, chemical etching, hot stamping, etc., in which a plurality of small projections and/or grooves are formed in the roughly treated area. The roughly treated area helps the light rays L2 leak out from the front surface 10a to the photocatalyst layer 20. In addition, the transmitting member 10 and the photocatalyst layer 20 have an increased surface area in the roughly treated area; therefore, the photocatalyst material included in the photocatalyst layer 20 can be efficiently activated by the light rays L2. On the contrary, the rear surface 10b is smooth as much as possible.

As an alternative, the front surface may have rough areas and smooth areas intermittently or alternately.

As another alternative, the rear surface 10b may have light reflecting metal coating such as Al or Ni by evaporating or sputtering.

As still another alternative, in addition to one line light type UV light source 200 installed at a vicinity of the side terminal 10c shown in FIG. 1, extra similar UV light source/sources may be installed at a vicinity of at least one of another side terminal/terminals in total four pieces.

The short wavelength rays L1 incident to one side terminal 10c of the short wavelength rays transmitting member 10 becomes the transmitting light rays L2(not shown in FIG. 3 & FIG. 4, see FIG. 2) transmitting repeatedly inside toward another side terminal 10d. And the transmitting light rays L2 are subjected to leak out gradually or little by little on the way of transmitting to the another side terminal 10d, due to existence of the roughly treated surface 10a.

A lot of photocatalyst particles 20b included in the photocatalyst layer 20 are activated by radiation of the light rays L2 leaking out from the surface 10a of the member 10, so that the object "OB"(shown in FIG. 1 and FIG. 2) contacted or stacked is subjected to be oxidized and/or reduced (cleaned up or reacted) by photocatalyst action of the activated photocatalyst particles 20b.

As photocatalyst 20b, $TiO_2$ can be applied for various fields, since it has an excellent photocatalizing function, long persistency(durability and life) and safety (harmless in case of adding to foods and toiletry goods).

Various embodiments of the invention will be described below. For simplifying explanation of other embodiments, the descriptions already explained will be omitted as much as possible.

Figure 7:
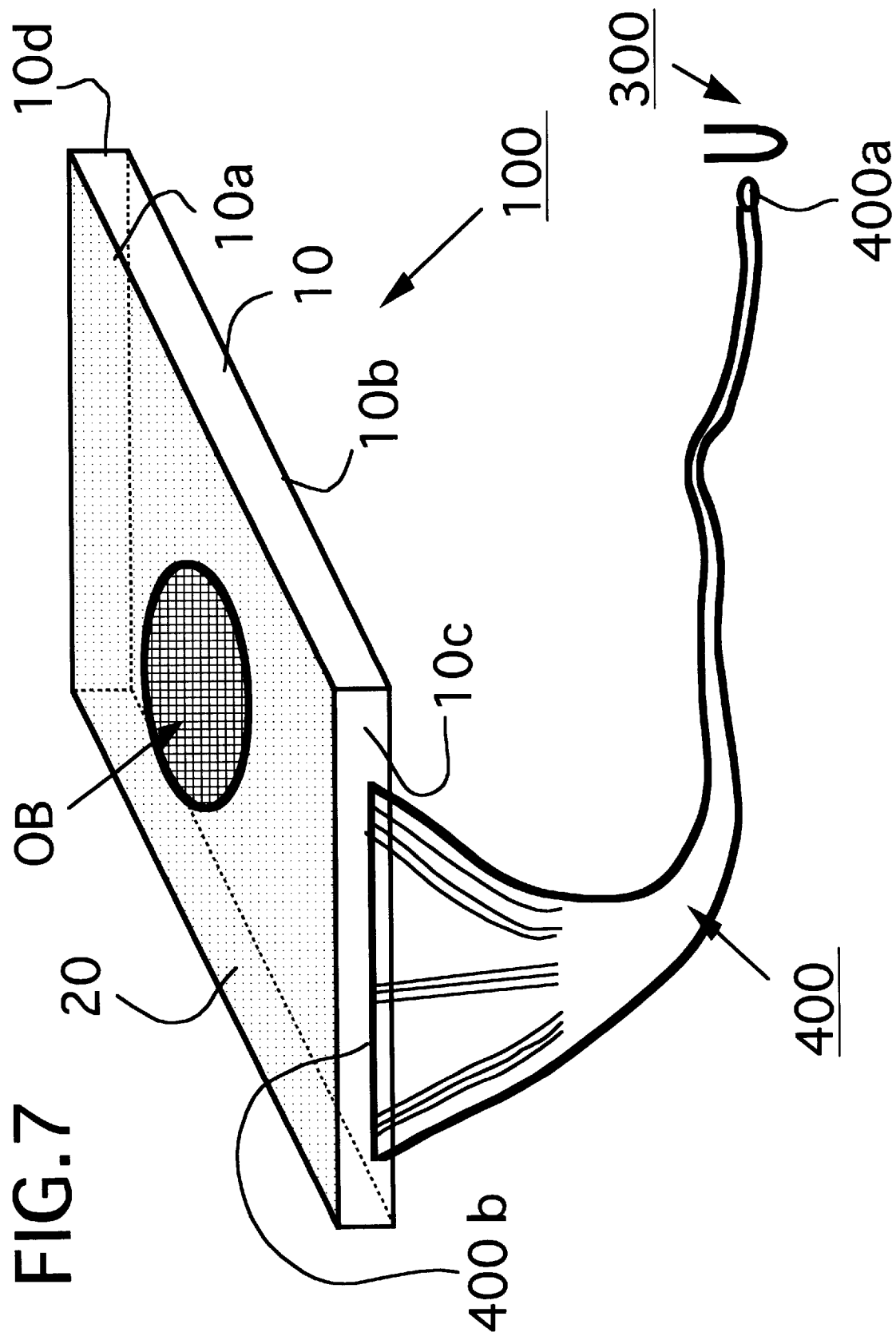
FIG. 7 illustrates a schematic perspective view explaining another embodiment of the invention.

FIG. 7 illustrates a schematic perspective view explaining another embodiment of the invention.

In this embodiment, an optical fiber cable 400 including a plurality of UV transmitting optical fibers are used differently from the first embodiment already explained, in which the optical fibers are tightly bundled to each other in one terminal 400a in circular form, etc. and the optical fibers are arranged in another terminal 400b in linear form.

Similarly to the first embodiment, the photocatalyst device 100 is composed of the short wavelength rays transmitting member 10 (UV transmitting panel) and the photocatalyst layer 20. The object "OB" to be cleaned-up or purified is in contact with, in close to, or is deposited on the photocatalyst layer 20.

As shown in FIG. 7, the short wavelength light source 200 of "U" shape, etc. is located in an appropriate place distant from the photocatalyst device 100. The optical fiber cable 400 is installed between the light source 200 and one side terminal 10c of the UV transmitting panel 10.

The optical fiber cable 400 receives UV light rays emitting from the UV light source 200 at the terminal 400a of the optical fiber cable 400 transmits the UV light rays to the other terminal 400b of the optical fiber cable 400. Since the other terminal 400b is positioned adjacent one side terminal 10c of the photocatalyst device 100, the UV light rays transmitted to the other side terminal 400b are introduced into the UV transmitting panel 10 of the photocatalyst device 100.

This embodiment has such advantage that the UV light source 200 can be installed at any place distant from the photocatalyst device 100. Therefore, for example, the entire photocatalyst device 100 may be placed inside any enclosure such as a case, a container, a receptacle, a tank, or etc. filled with a gaseous or a liquid object to be cleaned or reacted, while the light source 200 may be placed in any place distant from the photocatalyst device 100, by means of the optical fiber cable 400.

The UV transmitting optical fiber/fibers or cable/cables 400 capable of transmitting the light rays in ultra violet region are available from famous cable manufacturers, such as Mitsubishi Cable Industries Ltd., Tokyo, Japan.

Figure 8:
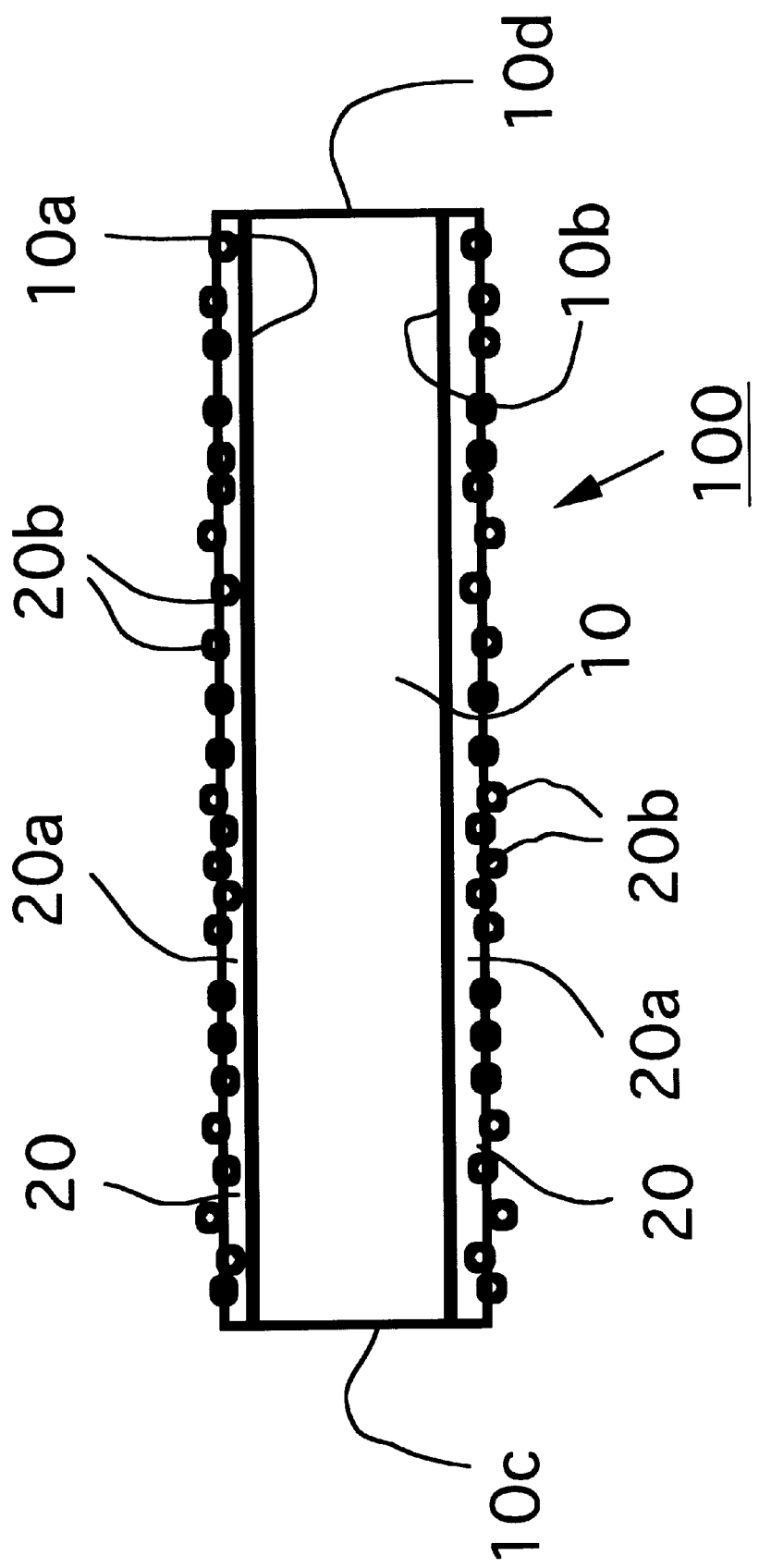
FIG. 8 illustrates a schematic enlarged cross-sectional view explaining still another embodiment of the invention.

FIG. 8 illustrates a schematic enlarged cross-sectional view explaining still another embodiment of the invention.

In this embodiment, the photocatalyst device 100 is composed of the UV transmitting panel 10 and a pair of photocatalyst layers 20 (with a binder 20a and photocatalyst particles 20b) in the front and rear surfaces 10a and 10b (while the UV transmitting panel 10 as shown in FIG. 1. has single photocatalyst layer 20 in the front surface 10a.)

This embodiment has the advantage that the object "OB" such as liquid, gas or particles can be fluidly contacted with both of photocatalyst layers 20 of the photocatalyst device 100, so as to be subject to be cleaned up or oxidized and/or reduced effectively from both sides.

Figure 9:
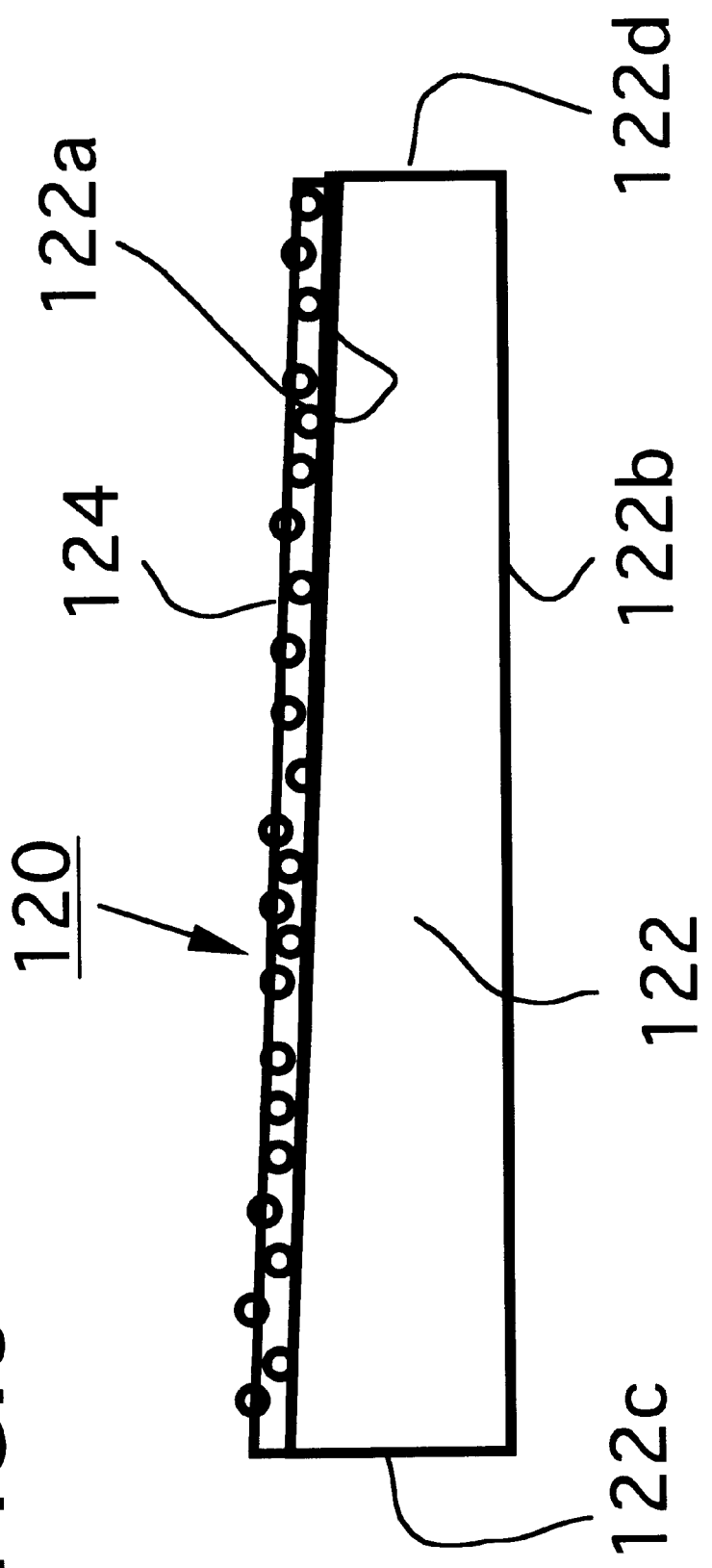
FIG. 9 illustrates a schematic enlarged cross-sectional view explaining other embodiment of the invention.

FIG. 9 illustrates a schematic enlarged cross-sectional view explaining other embodiment of the invention.

A photocatalyst device 120 is composed of a UV transmitting member 122 (with a front surface 122a, a rear surface 122b, a side terminal 122c, and another side terminal 122d etc.) and a photocatalyst layer 124 formed on the front surface 122a.

In this embodiment, the photocatalyst device 120 and the UV transmitting member 122 are formed as a tapered panel, while the photocatalyst devices 100 and UV transmitting panels 10 in before mentioned embodiments have substantially uniform thickness.

As the UV transmitting member 122 is of the tapered panel which thickness is gradually decreased from the side terminal 122c toward the side terminal 122d in this embodiment, UV light rays can be gradually leaked out to the photocatalyst layer 124 from the front surface 122a of the UV transmitting member 122, all the photocatalyst layer 124 can be radiated from rear side by the UV light rays, uniformly in any area of the surface 122a.

The metal reflected coating is preferably provided on the rear surface 122b for the UV light rays not to leak out.

Figure 10:
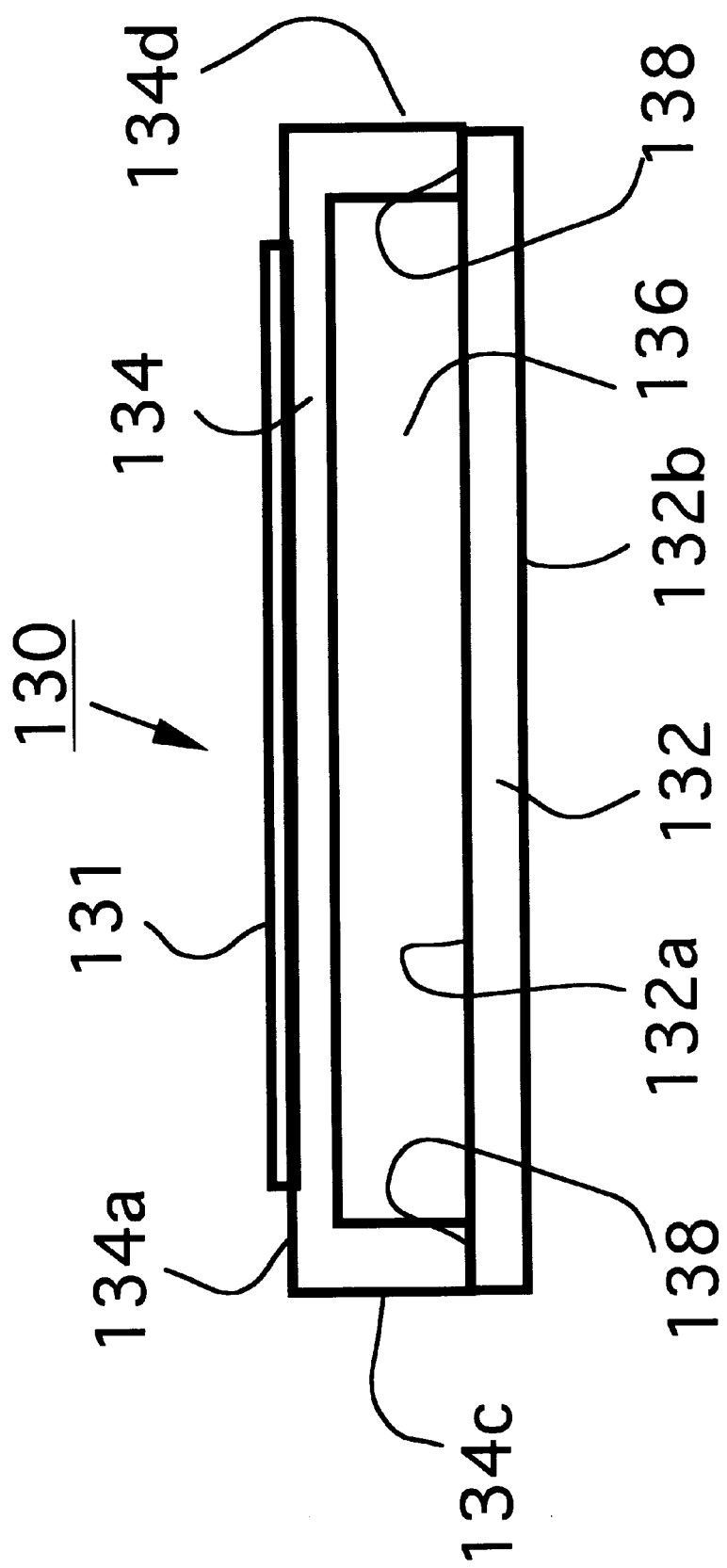
FIG. 10 illustrates a schematic enlarged cross-sectional view explaining further embodiment of the invention.

FIG. 10 illustrates a schematic enlarged cross-sectional view explaining further embodiment of the invention.

In FIG. 10, a photocatalyst device 130 is composed of a UV transmitting top member 134 formed as concave (or convex) shape as shown in the drawing with a photocatalyst layer 131 formed on a front surface 134a, a UV transmitting or reflecting bottom panel 132 (with a front surface 132a and a rear surface 132b) and an air space 136 in which UV light rays are introduced from a side terminal 134c, are transmitted to another side terminal 134d and are leaked out to the photocatalyst layer 131.

The top member with concave shape 134 and the bottom panel 132 are bonded together between facing portion 138.

Figure 11:
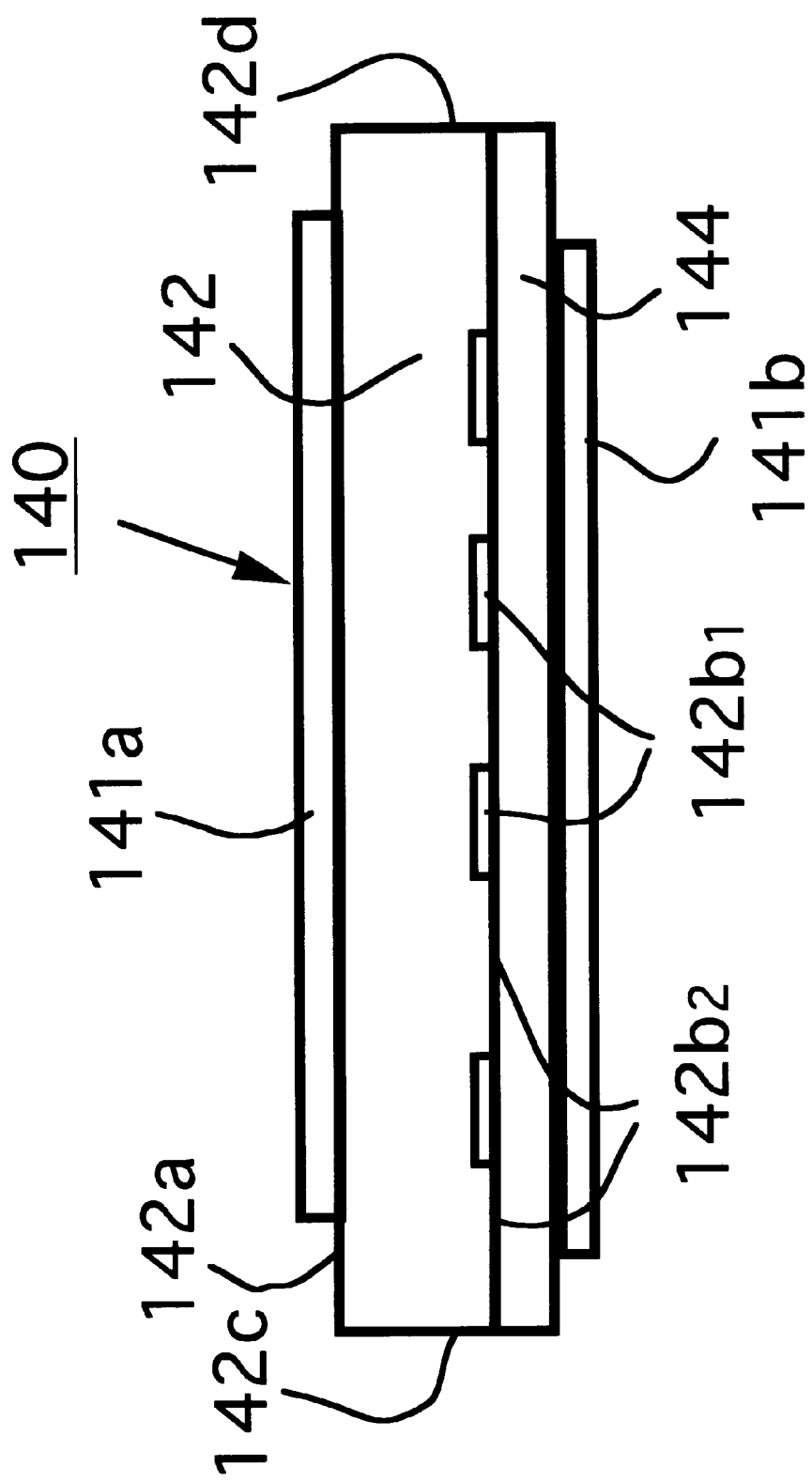
FIG. 11 illustrates a schematic enlarged cross-sectional view explaining still further more embodiment of the invention.

FIG. 11 illustrates a schematic enlarged cross-sectional view explaining still further embodiment of the invention.

In FIG. 11, a photocatalyst device 140 is composed of a UV transmitting member 142 formed as a substantially uniform thickness panel(UV transmitting panel) with multiple rough light diffusing rear surface 142b1 (formed with roughly treated area) and multiple smooth rear surface 142b2 alternately, UV transmitting layer 144 coated on the read surfaces 142b1 and 142b2, a photocatalyst layer 141a supported on a front surface 142a of the UV transmitting panel 142 and another photocatalyst layer 141b supported on the UV transmitting layer 144.

UV light rays are introduced from a side terminal 142c to inside of the UV transmitting panel 142, they are transmitted repeating multiple reflection toward another terminal 142d according to similar principle to optical fiber, at the same time they are leaking gradually to the photocatalyst layers 141a and 141b. As shown in FIG. 11, a distribution density of the multiple rough surfaces 142b1 is increased gradually from one side terminal 142c toward another side terminal 142d, therefore, both photocatalyst layers 141a & 141b can be radiated almost uniformly at any place on the surface by the UV light rays.

Figure 12:
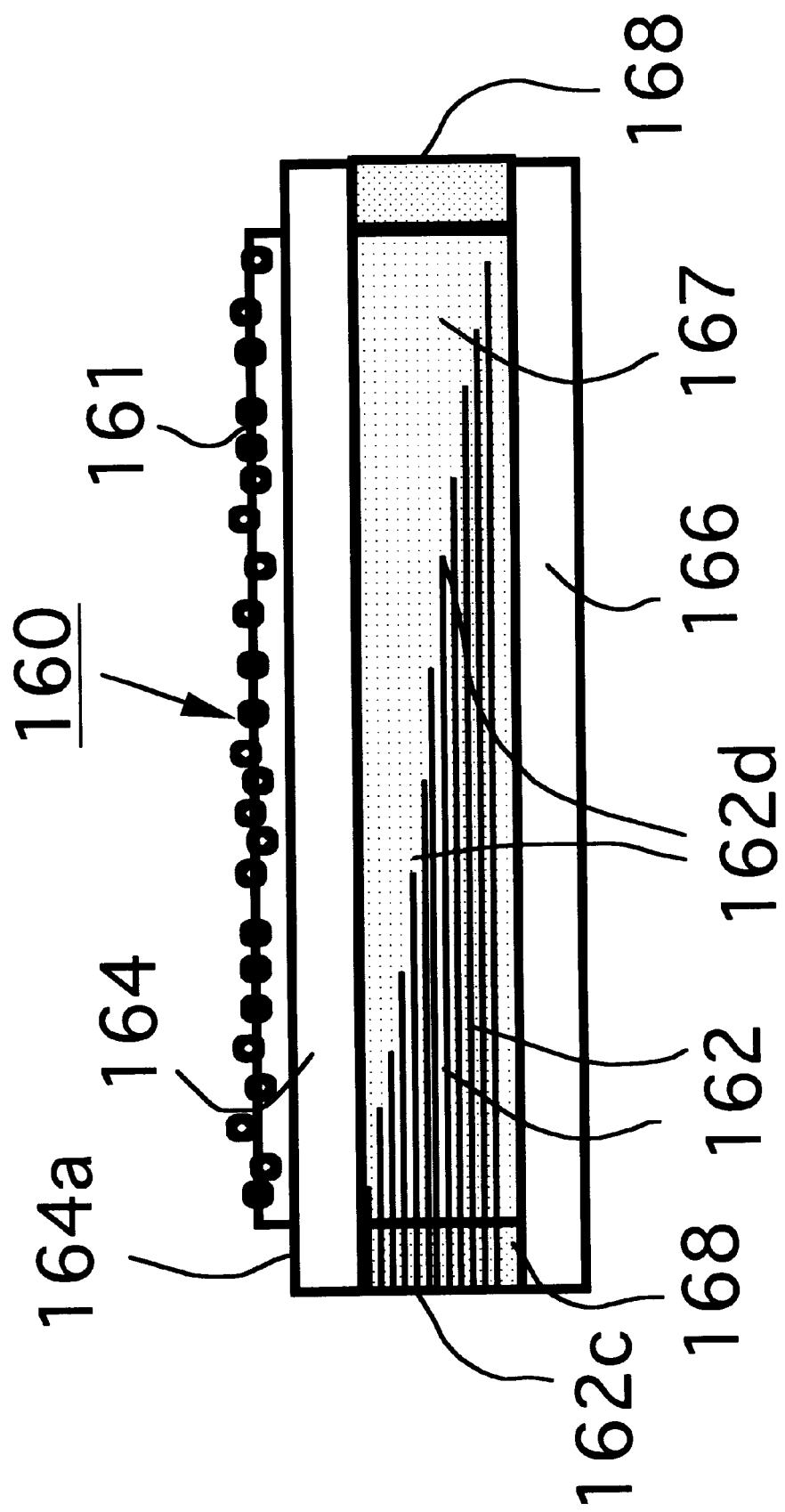
FIG. 12 illustrates a schematic enlarged cross-sectional view explaining further embodiment of the invention.

FIG. 12 illustrates a schematic enlarged cross-sectional view explaining still more embodiment of the invention.

In FIG. 12, a photocatalyst device 160 is composed of a UV transmitting top panel 164 with substantially uniform thickness, a photocatalyst layer 161 supported on a front surface 164a, a bottom panel 166, multiple UV transmitting optical fibers 162 of varying lengths are positioned in a space 167 between both panels 164 and 166 and two spacers 168 to keep and fix both panels 164 and 166 at a uniform gap and the optical fibers 162 at terminals 162c.

One group of terminals 162c (fixed terminals) of the multiple optical fibers 162 end at a same position, while another group of terminals 162d (free terminals) of the multiple optical fibers 162 end at different positions. The space 167 may be filled with UV transparent liquid or resin.

UV light rays incident to the fixed terminals 162c of the multiple optical fibers 162 are transmitted to the free terminals 162d and radiate the photocatalyst layer 161 via the top panel 161 to activate it. The bottom panel 166 may have an UV reflecting layer on a surface(not shown in FIG. 12) to effectively reflect the UV light rays upward.

Figure 13:
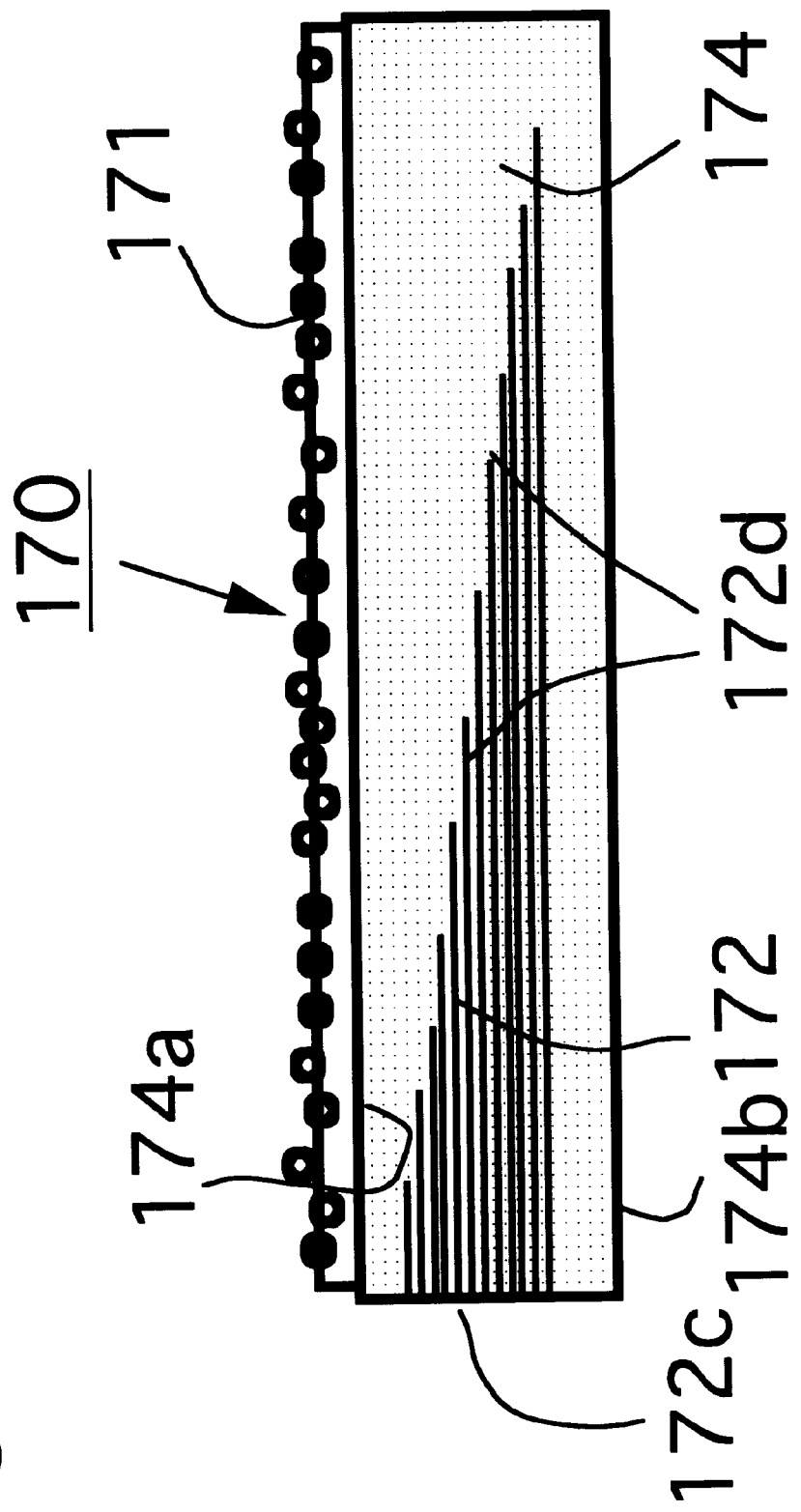
FIG. 13 illustrates a schematic enlarged cross-sectional view explaining further embodiment of the invention.

FIG. 13 illustrates a schematic enlarged cross-sectional view explaining further more embodiment of the invention.

In FIG. 13, a photocatalyst device 170 is composed of multiple UV transmitting optical fibers 172 of varying lengths, UV transmitting plastic molding body 174 (or resin compound) and a photocatalyst layer 171 on a front surface 174a of the molding body 174. The optical fibers 172 are embedded in the resin compound 174 such as UV transmitting acrylic resin and silicon resin.

Fixed terminals 172c of the multiple optical fibers 172 end at the same position, while free terminals 172d of the multiple optical fibers 172 end at different positions. UV light rays incident to the fixed terminals 172c of the multiple optical fibers 172 are transmitted to the free terminals 172d and radiate the photocatalyst layer 171 via the UV transmitting plastic molding body 174 to activate the photocatalyst layer 171. The molding body 174 may have UV reflecting layer(not shown in FIG. 13) on a rear surface 174b to effectively reflect the UV light rays upward.

Figure 14:
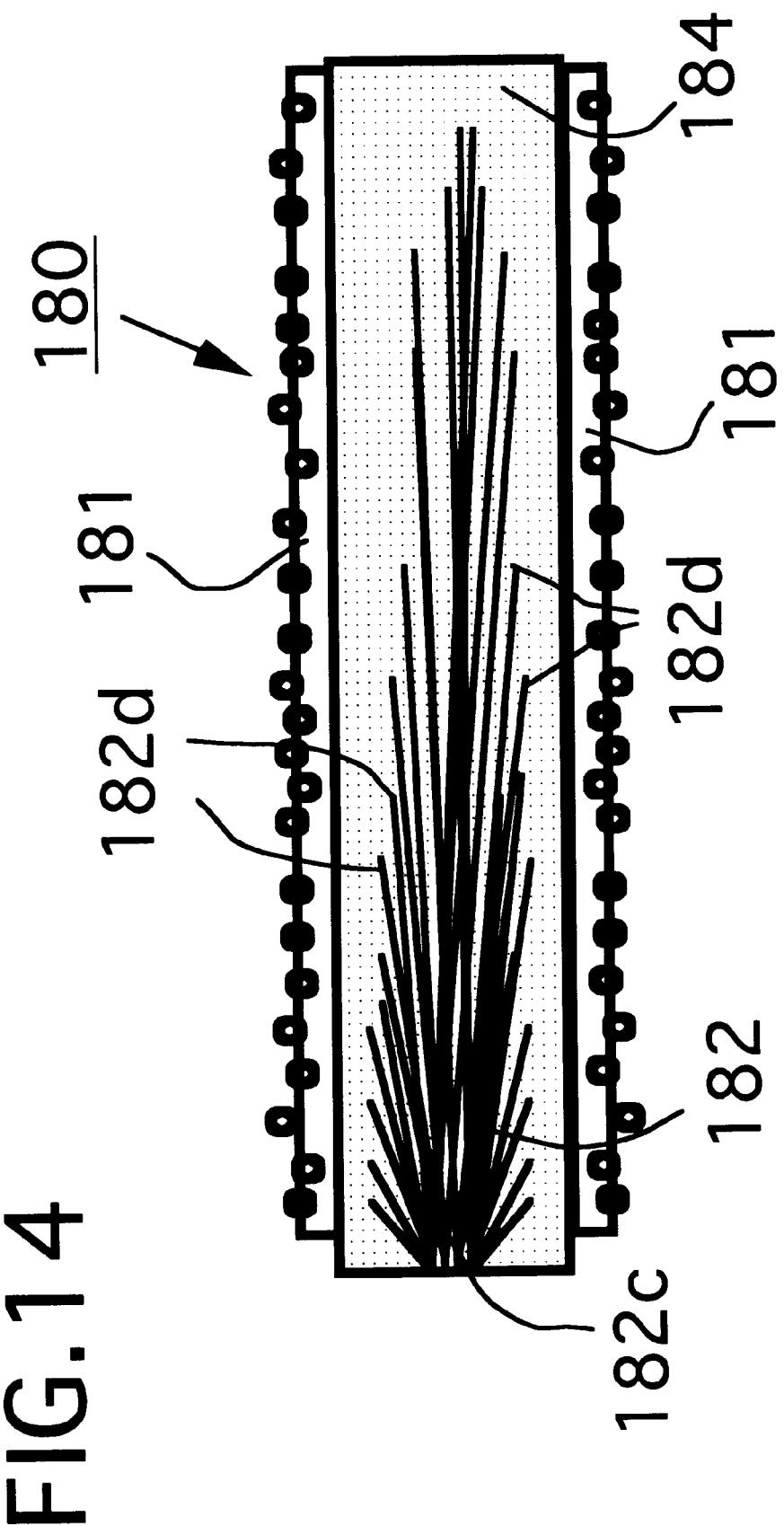
FIG. 14 illustrates a schematic enlarged cross-sectional view explaining further embodiment of the invention.

FIG. 14 illustrates a schematic enlarged cross-sectional view explaining still further another embodiment of the invention.

In FIG. 14, a photocatalyst device 180 is composed of multiple UV transmitting optical fibers 182 with different length like branches of a tree, UV transmitting plastic molding body 184 (or resin compound), and a pair of photocatalyst layers 181 on front and rear surfaces of the molding body 184. The optical fibers 182 are embedded in the resin compound 184 such as UV transmitting acrylic resin and silicon resin.

Fixed terminals 182c of the multiple optical fibers 182 end so as the contact closely each other at a small spot, while free terminals 182d of the multiple optical fibers 182 end radially at different positions like tree branches.

UV light rays incident to the fixed terminals 182c of the multiple optical fibers 182 are transmitted to the free terminals 182d and radiate both photocatalyst layers 181 via the UV transmitting plastic molding body 184 to activate the photocatalyst layers 181.

Figure 15:
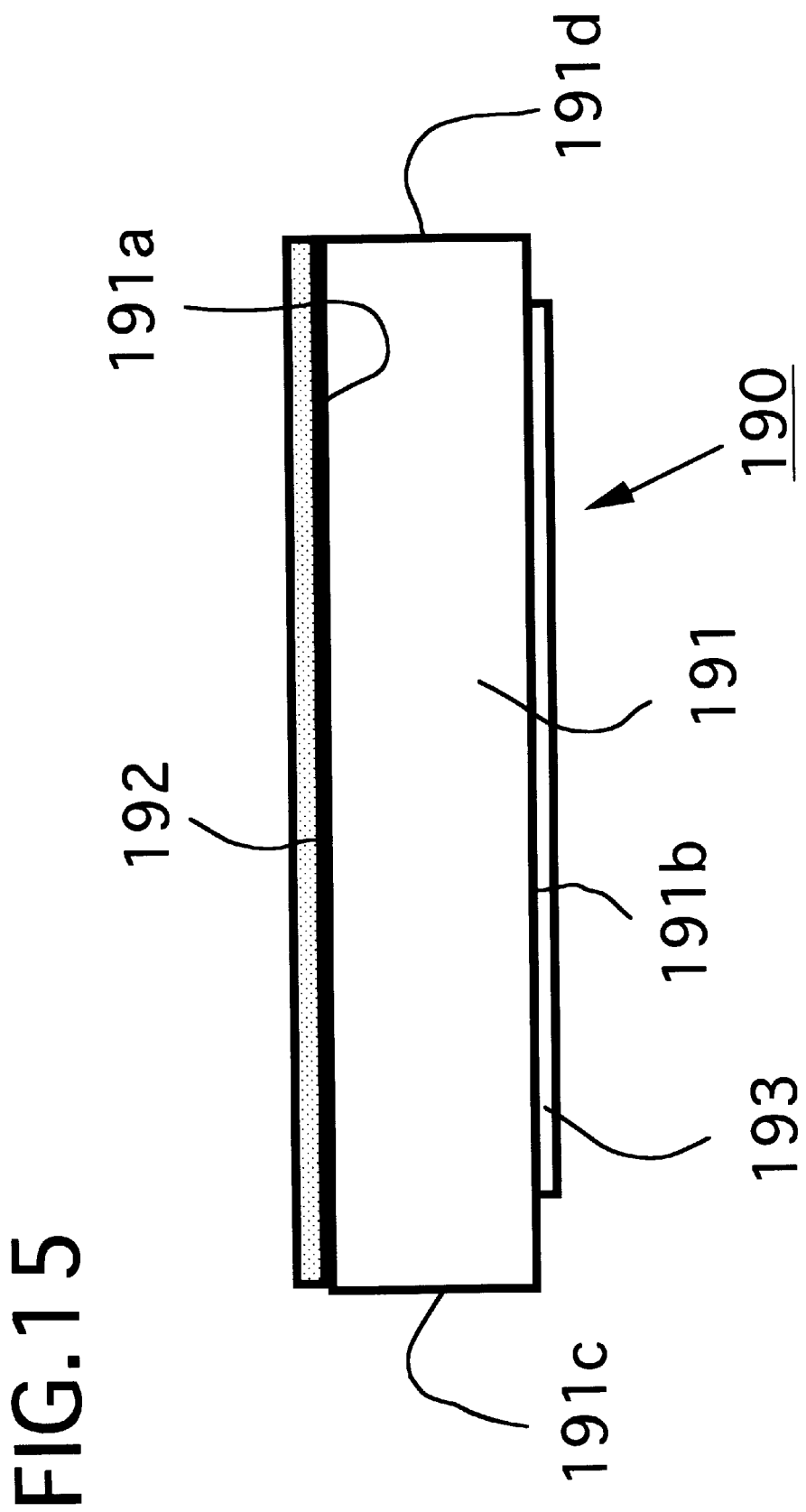
FIG. 15 illustrates a schematic enlarged cross-sectional view explaining further embodiment of the invention.

FIG. 15 illustrates a schematic enlarged cross-sectional view explaining still further another embodiment of the invention.

In FIG. 15, a photocatalyst device 190 is composed of a UV transmitting panel 191, a phosphor layer 192 supported on a front surface 191a of the panel 191 and a photocatalyst layer 193 supported on a rear surface 191b of the panel 191.

The phosphor layer 192 may be further composed of multiple phosphor particles and UV transparent binders which may be made of UV transparent organic resin or inorganic glass frits or powders.

The phosphor layer 192 includes the phosphor materials capable of emitting visible light when activating by invisible UV rays, such as Cd halo-phosphate for emitting white color, Mg tungstate for emitting blue colors, Zn silicate for emitting green color and Ca silicate for emitting orange color.

Therefore, UV rays incident from a side terminal 191*c* are transmitted to another side terminal 191*d* and also leaked to activate the phosphor layer 192 from the front surface 191*a* and also the photocatalyst layer 193 from the rear surface 191*b*.

The phosphor layer 192 radiated by the invisible UV rays from the front surface 191*a* is subject to be activated and emits visible color light to inform users that the UV light source (See numeral 200 in FIG. 1 and FIG. 7) is on, like a visible indicator.

In various above mentioned embodiments of the invention, the short wavelength light rays L1 are introduced from the side terminal of the photocatalyst device(or the short wavelength light rays transmitting member), the short wavelength light rays L1 may be alternatively introduced from a terminal portion of front surface and/or rear surface in the photocatalyst device(the short wavelength light rays transmitting member) using an optical means such as prism/prisms.

It is to be understood that the forgoing description is preferred embodiments of the invention and that various changes, modifications, or equivalents may be made in the invention without departing from the spirit and the scope of the present invention and the appended claims.

What is claimed is:

1. A photocatalyst device comprising:

light guide means composed of a substantially transparent member having a first surface and/or a second surface;

a plurality of diffusing areas and a plurality of non-diffusing area disposed alternately on said first surface and/or said second surface; and photocatalyst means including photocatalyst material, disposed adjacent to, or disposed on said transparent member.

2. The photocatalyst device according to claim 1:

wherein said transparent member is composed of a transparent panel having a substantially uniform thickness.

3. The photocatalyst device according to claim 1;

wherein said transparent member is composed of a transparent panel having a substantially variable thickness.

4. The photocatalyst device according to claim 1:

wherein a density of said diffusing areas and/or said non-diffusing areas is variably distributed on said first surface and/or said second surface.

5. The photocatalyst device according to claim 1:

wherein said transparent member is composed of a transparent panel having a substantially uniform thickness, a first surface and/or a second surface; and wherein a density of said diffusing areas and/or said non-diffusing areas is variably distributed on said first surface and/or said second surface.

6. The photocatalyst device according to claim 1:

wherein said transparent member is composed of a transparent panel having a substantially variable thickness, a first surface and a second surface; and wherein a density of said diffusing areas and/or said non-diffusing areas is variably distributed on said first surface and/or said second surface.

7. The photocatalyst device according to claim 1:

wherein said diffusing areas are rough surface areas and/or said non-diffusing areas are smooth surface areas.

8. A photocatalyst reactor comprising:

the photocatalyst device of claim 1; and one or more light sources generating light directed toward said transparent member.

* * * * *